United States Patent [19]

Inagoya et al.

[11] Patent Number: 5,057,955
[45] Date of Patent: Oct. 15, 1991

[54] COMPOSITE MAGNETIC HEAD

[75] Inventors: Osamu Inagoya; Takeshi Tottori, both of Ibaraki; Kazunari Nakagawa, Toride; Hirosuke Mikami, Tsukuba; Hideo Fujiwara, Ibaraki, all of Japan

[73] Assignee: Hitachi Maxell, Ltd., Osaka, Japan

[21] Appl. No.: 419,104

[22] Filed: Oct. 10, 1989

[30] Foreign Application Priority Data

Oct. 11, 1988 [JP] Japan .................................. 63-253724

[51] Int. Cl.$^5$ ............................................. G11B 5/265
[52] U.S. Cl. ..................................... 360/121; 360/125
[58] Field of Search ................ 360/121, 125, 127, 122

[56] References Cited

U.S. PATENT DOCUMENTS

| | | | |
|---|---|---|---|
| 4,246,619 | 1/1981 | Hirai et al. | 360/125 |
| 4,316,228 | 2/1982 | Fujiwara et al. | 360/127 |
| 4,439,794 | 3/1984 | Shiroishi et al. | 360/127 |
| 4,571,652 | 2/1986 | Fujiwara et al. | 360/125 |
| 4,604,670 | 8/1986 | Visser | 360/125 X |
| 4,731,683 | 3/1988 | Otomo et al. | 360/125 X |
| 4,939,608 | 7/1990 | Okamura et al. | 360/121 |
| 4,941,064 | 7/1990 | Tottori et al. | 360/121 X |

FOREIGN PATENT DOCUMENTS 63-308715 12/1988 Japan ................................... 360/121

Primary Examiner—John H. Wolff

[57] ABSTRACT

A composite magnetic head having a recording/playback head and an erasing head combined in one unit through a nonmagnetic material is constructed such that at least one of two core halves constituting the erasing head adjacent to the recording and reproducing head is made of single crystal ferrite, a plane (100) of the single crystal ferrite is substantially parallel to a principal magnetic path-forming plane, and an angle $\theta$ between an orientation <100> existing in the plane (100) and an operating gap (magnetic gap)-forming plane is in the range of 10°–40° or 80°–120°. The composite magnetic head thus constructed can be made to have a reduced distance between magnetic gaps of both heads so as to be suited for being attached to the compact high-density recording and reproducing apparatus while eliminating crosstalk.

11 Claims, 6 Drawing Sheets

COMPOSITE MAGNETIC HEAD

BACKGROUND OF THE INVENTION

1. Field of the Invention

The present invention relates to a composite magnetic head having a recording/playback head and an erasing head combined in one unit, and more particularly, to a composite magnetic head which is made to have a reduced distance between gaps of both magnetic heads while improving reduction of cross talk in a compact high-density recording and reproducing apparatus.

2. Description of the Background Art

FIGS. 4 and 5 illustrate a conventional composite magnetic head of bulk type. FIG. 4 is a plan view of the magnetic head and FIG. 5 is a sectional view taken along the line A—A of FIG. 4.

A recording/playback head 1 and an erasing head 2 are combined in one unit through a nonmagnetic plate 3 in order to avoid magnetic interaction therebetween. The recording/playback head 1 is constituted by a first core half 5 made of ferrite, for example, which is formed with a coil groove 4 by machining such as cutting and a second core half 6 made of ferrite, for example, which is arranged to be opposed to the first core half 5. Further included is a gap spacer 7 made of silicon dioxide, for example, which is interposed between the both core halves 5 and 6, reinforcing portions 8 made of glass or the like, for example, which are provided in the vicinity of the joint portion between the both core halves 5 and 6, and an energizing coil 9 which is wound in the coil groove 4 around the first core half 5.

On the other hand, the erasing head 2 is constituted by a first core half 11 made of ferrite, for example, which is formed with a coil groove 10 by machining such as cutting and a second core half 12 made of ferrite, for example, which is arranged to be opposed to the first core half 11. Further included is a gap spacer 13 made of silicon dioxide, for example, which is interposed between the both core halves 11 and 12, reinforcing portions 14 made of glass or the like, for example, which are provided in the vicinity of the joint portion between the both core halves 11 and 12, and an energizing coil 15 which is wound in the coil groove 10 around the first core half 11.

In FIG. 4, an arrow X indicates the travelling direction of a magnetic recording medium (not shown) such as a magnetic disc. The recording/playback head 1 is arranged on the upstream side of the erasing head 2 with respect to the travelling direction X. The magnetic gap of the recording/playback head 1 formed by gap spacer 7 and the magnetic gap of the erasing head 2 formed by the gap spacer 13 are arranged to satisfy the relationship therebetween as shown in FIG. 4. Therefore, the data recorded over a track of the magnetic disc by means of the recording/playback head is partially erased at its one or both side end portion(s) by means of the succeeding erasing head 2 to provide an accurately recorded track, or thereby assuring off-track margin(s) of the head.

FIGS. 6 and 7 are explanatory views of the manner of formation of the recorded track with using of this kind of composite magnetic head. FIG. 6 shows the manner of formation of the recorded track in the outer peripheral region of the magnetic disc and FIG. 7 shows the manner of formation of the recorded track in the inner peripheral region of the magnetic disc.

In these drawings, reference numerals 16, 17, 18, 19, 20 and 21 denote a magnetic gap of the recording/playback head, a magnetic gap of the erasing head, recorded tracks after the width-correction by the erasing head 17, a center of rotation of the magnetic disc, the erased width on the inner peripheral side to be erased by the erasing head, and the track pitch between adjacent tracks, respectively. The magnetic gap 16 of the recording/playback head 16 extends radially, while the gap 17 extends in parallel with the gap 16.

The magnetic disc is provided with annular recording zones having a predetermined width, and the curvatures of the recording zones are different from each other between the annular recording zones at the outer and inner peripheral regions thereof. Comparing the annular recording zone at the outer peripheral region having a smaller curvature with that at the inner peripheral region having a larger curvature, the erased radial width 20 to be erased by the erasing head is larger for the annular recording zone at the inner peripheral region (FIG. 7) than for the zone at the outer peripheral region (FIG. 6). As a consequence, the track pitch 21 shows a delicate change depending on the radial position of the tracks. This is notable particularly in a case where the curvature shows a great change between the radially outer and inner peripheral regions in a compact or small magnetic disc, and furthermore, in a case where the distance L between the magnetic gap 16 of the recording/playback head and the magnetic gap 17 of the erasing head 2 is long.

Difference in the track pitch (the distance between adjacent tracks) depending upon the radial position thereof mentioned above brings about difficulty particularly in the case of high-density recording.

In addition, the coercive force of the magnetic recording medium has recently become large as a result of increase in the recording density, so that it becomes impossible in some cases to overwrite sufficiently with use of the recording head. For this reason, it is proposed as well that recording is preceded by erasing. In this case as well, it is necessary to reduce the distance between the gaps of the both heads for the reason mentioned above.

To cope with the above-mentioned problems, there has been made attempts to thin the second core halves 6 and 12 by grinding/polishing so as to reduce the distance L between the magnetic gaps 16 and 17. However, in the case of mechanical cutting mentioned above, the gap distance L is limited to 0.8 mm or so in consideration of the manufacturing yield, so that it is impossible to obtain a satisfactory effect.

In order to provide a composite magnetic head which overcomes such disadvantages and in which the recording/playback head and the erasing head are combined in one unit and the distance between both magnetic gaps is reduced sufficiently so as to be suitably used in a compact high-density recording and reproducing apparatus, the applicants have proposed a composite magnetic head as disclosed in Japanese Patent Application No. 62-236293.

In the composite magnetic head described above, the recording/playback head and the erasing head are each coated with a nonmagnetic thin layer and are joined with each other. Coating of the nonmagnetic layer makes it possible to thin a nonmagnetic layer serving to joint the recording/playback head and the erasing head with each other greatly, thereby making it possible to reduce the distance between the both magnetic gaps.

However, in the case where the erasing head has an insufficient erasing ability, there is caused a phenomenon called crosstalk which deteriorates the recording and reproducing characteristic of the composite recording head.

It is noted here that crosstalk is caused due to leakage of the magnetic flux of the erasing head to the recording/playback head at the time of recording and due to leakage of the magnetic flux induced from the gap of the erasing head to the recording/playback head at the time of reproduction. FIG. 8 shows this phenomenon, in which reference symbols $\Phi_0$, $\Phi_1$, $\Phi_2$ and $\Phi_3$ represent the magnetic flux passing through the core of the erasing head remote from the recording/playback head, the magnetic flux passing through a portion of the erasing head adjacent to the recording and reproducing head, the magnetic flux passing through a portion of the recording/playback head adjacent to the erasing head, and the magnetic flux passing through the core of the recording/playback head remote from the erasing head, respectively.

As seen from FIG. 8, the magnetic fluxes $\Phi_1$, $\Phi_2$, and $\Phi_3$ are parallel to each other so that it is necessary to reduce the magnetic fluxes $\Phi_2$, and $\Phi_3$ in order to improve the recording and reproducing characteristic of the composite magnetic head.

To this end, it is necessary to reduce the magnetic reluctance of the core of the erasing head to a valve adjacent to the recording/playback head less than that of the core of the recording/playback head.

Heretofore, polycrystalline ferrite has been used as the material for the erasing head from the viewpoint of cost and the like since the magnetic reluctance has not been a serious problem in the erasing head as compared with the recording/playback head, resulting in the problem that the crosstalk cannot be decreased.

SUMMARY OF THE INVENTION

An object of the present invention is to provide a composite magnetic head which is made to have a reduced distance between the magnetic gaps so as to be suited for being attached to the compact high-density recording and reproducing apparatus and which is capable of eliminating crosstalk while overcoming the abovedescribed problems encountered in the conventional composite magnetic head.

To this end, according to the present invention, there is provided a composite magnetic head having a recording/playback head and an erasing head combined in one unit through a non-magnetic material. At least one of two core halves constituting the erasing head adjacent to the recording and reproducing head is made of single crystal ferrite. A plane (100) of the single crystal ferrite is substantially parallel to a principal magnetic path-forming plane, and an angle $\theta$ between an orientation <100> existing in the plane is in a range of 10°–40° or 80°–120°. (100) and an operating gap (magnetic gap)-forming plane

As described above, according to the present invention, at least one of two core halves of the erasing head adjacent to the recording and reproducing head is made of single crystal Mn-Zn ferrite, and the orientation <100> existing in the plane (100) of the single crystal ferrite makes a predetermined angle with respect to the joint surface (magnetic gap), and therefore, the erasing ability or efficiency of the erasing head is improved and the magnetic flux is prevented from leaking from the gap of the erasing head to the recording/playback head at the time of recording and reproduction, with the result that the recording and reproducing characteristic can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects and features of the present invention will become more clear from the following description of preferred embodiments in conjunction with the accompanying drawings which are given by way of illustration only, and thus are not limitative of the present invention, and in which.

DETAILED DESCRIPTION OF PREFERRED EMBODIMENT

Description will be given below of preferred embodiments of the present invention with reference to the drawings.

Figure 1:
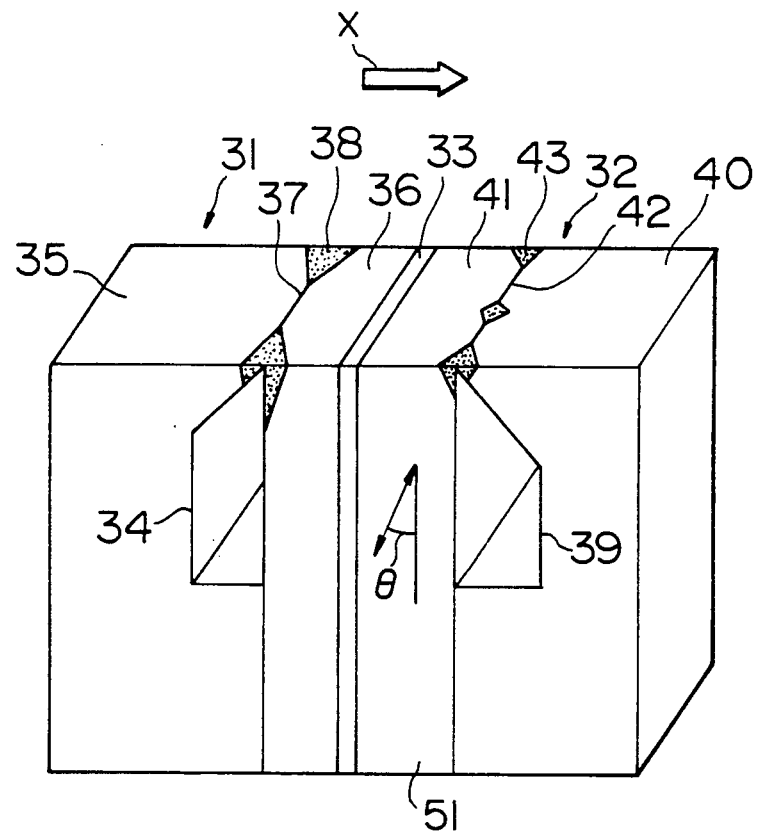
FIG. 1 is a perspective view of a composite magnetic head in accordance with an embodiment of the present invention.

FIG. 1 is a perspective view of a composite magnetic head in accordance with an embodiment of the present invention. In this composite magnetic head, a recording/playback head 31 and an erasing head 32 are combined in one unit through a nonmagnetic layer 33 for the purpose of avoiding magnetic interaction or cross-talk therebetween. The recording/playback head 31 and the erasing head 32 are incorporated in a head holding unit in such a manner that the former is arranged on the upstream side of the latter with respect to the travelling direction X of the magnetic recording medium, such as magnetic disc.

The recording/playback head 31 is constituted by a first core half 35 which is formed with a coil groove 34 by machining such as cutting and a second core half 36 which is arranged to be opposed to the first core half 35. Further included is a gap spacer 37 which is interposed between the both core halves 35 and 36 and reinforcing portions 38 made of glass or the like, which are provided in the vicinity of the joint portion between the both core halves 35, 36 and the gap spacer 37. The core halves 35 and 36 are made of Mn-Zn ferrite.

The erasing head 32 is constituted by a first core half 40 which is formed with a coil groove 39 by machining such as cutting, a second core half 41 which is arranged to be opposed to the first core half 40. Further included are reinforcing portions 43 made of glass or the like, which are provided in the vicinity of the joint portion between the core halves 40, 41 and a gap spacer 42 interposed between the core halves 40, 41.

One or both the recording/playback head 31 and the erasing head 32 have their surfaces coated with a nonmagnetic material using thin film deposition techniques such as vacuum evaporation and sputtering, thereby forming a thin nonmagnetic layer 33.

After formation of the nonmagnetic layer 33 in this way, the recording/playback head 31 and the erasing head 32 are joined to each other. As the material for forming the nonmagnetic layer 33, aluminum oxide, zirconia, silicon dioxide, beryllium copper or the like can be used.

The film deposition techniques described above make it possible to form the nonmagnetic layer 33 having a very small thickness. It is therefore possible to reduce the distance between the gaps of the recording/playback head and the erasing head.

However, if the thickness of the nonmagnetic layer 33 is too small, the recording magnetic field is made asymmetrical due to the magnetic flux of the erasing head so that the reproduced signal waveform becomes significantly asymmetrical. It is therefore preferable that the thickness of the nonmagnetic layer 33 is in the range between 0.1 mm and 1 $\mu$m.

It is noted here that both of the core halves 40 and 41 constituting the erasing head 32 or only the core half 41 adjacent to the recording and reproducing head 31 is made of single crystal Mn-Zn ferrite. Single crystal Mn-Zn ferrite exhibits a high erasing efficiency and, accordingly, is very useful as the material for the core half.

A plane (100) of the single crystal Mn-Zn ferrite is substantially parallel to a principal magnetic path-forming plane, that is, the magnetic path plane, in which a closed loop of each magnetic flux lies, formed by the magnetic flux $\Phi_0$ and $\Phi_1$ induced in the damper. Thus, a surface portion 51 is oriented to be the plane (100). Further, it is designed that an angle $\theta$ between the orientation or direction <100> existing in the plane (100) and the operating gap (magnetic gap formed by the gap spacer 42) is in the range of 10°-40° or 80°-120°.

The single crystal Mn-Zn ferrite having the above-mentioned structure can be manufactured by cutting the ingot or substrate of single crystalline Mn-Zn ferrite at a cutting angle selected to satisfy the condition of angle $\theta$. In consequence, it is possible to readily obtain the single crystalline Mn-Zn ferrite used in the present invention from the inexpensive single crystalline Mn-Zn ferrite which exhibits high erasing efficiency and has high workability.

Figure 2:
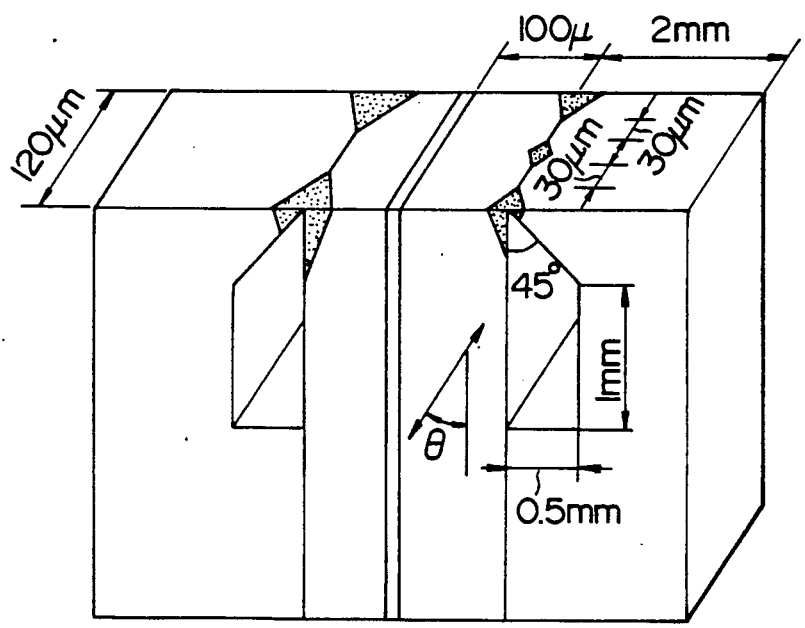
FIG. 2 is an explanatory view of an experiment made on the composite magnetic head shown in FIG. 1.
Figure 3:
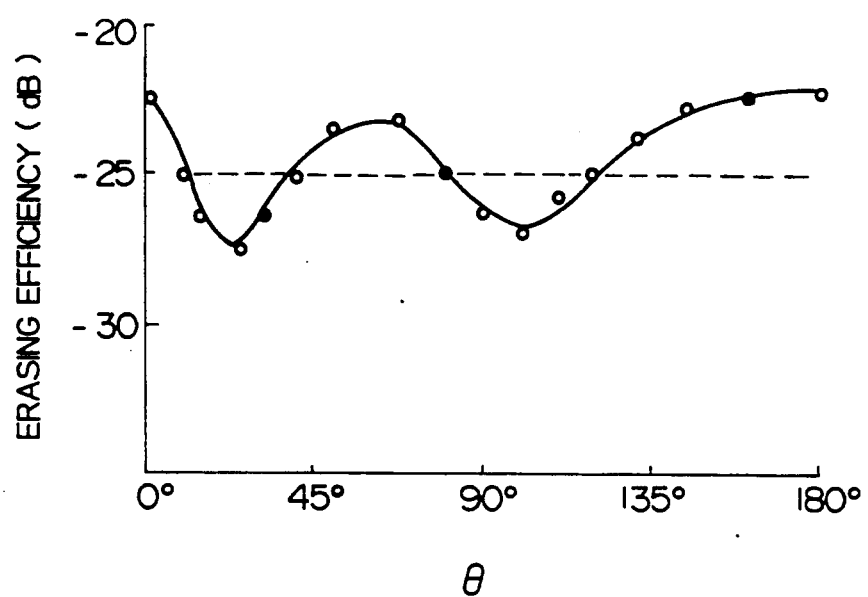
FIG. 3 is a graph showinq the relationship between the erasing efficiency and the angle $\theta$ between the orientation <100> existing in the plane (100) of the single crystal Mn-Zn ferrite and the operating gap plane.
Figure 4:
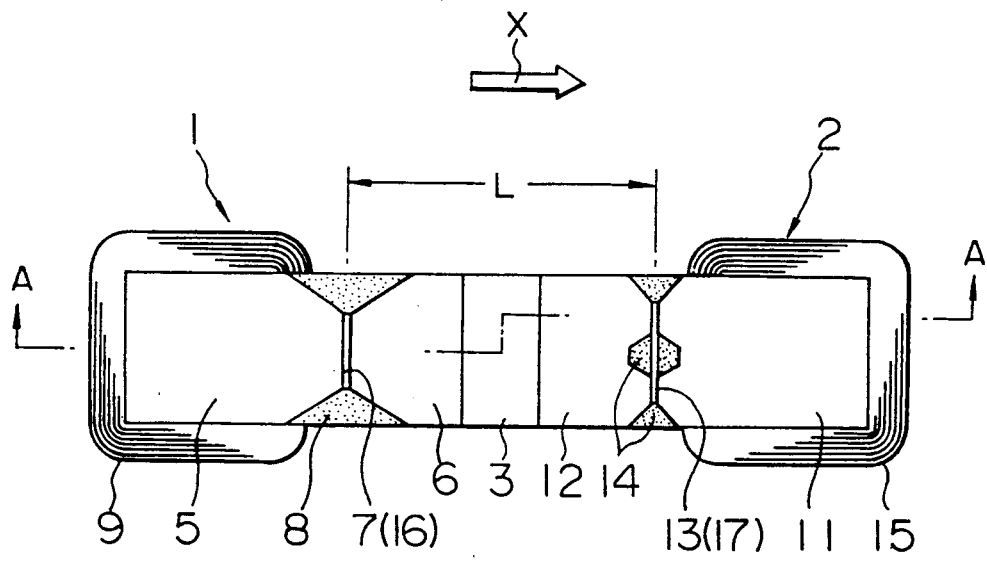
FIG. 4 is a plan view of a conventional composite magnetic head.
Figure 5:
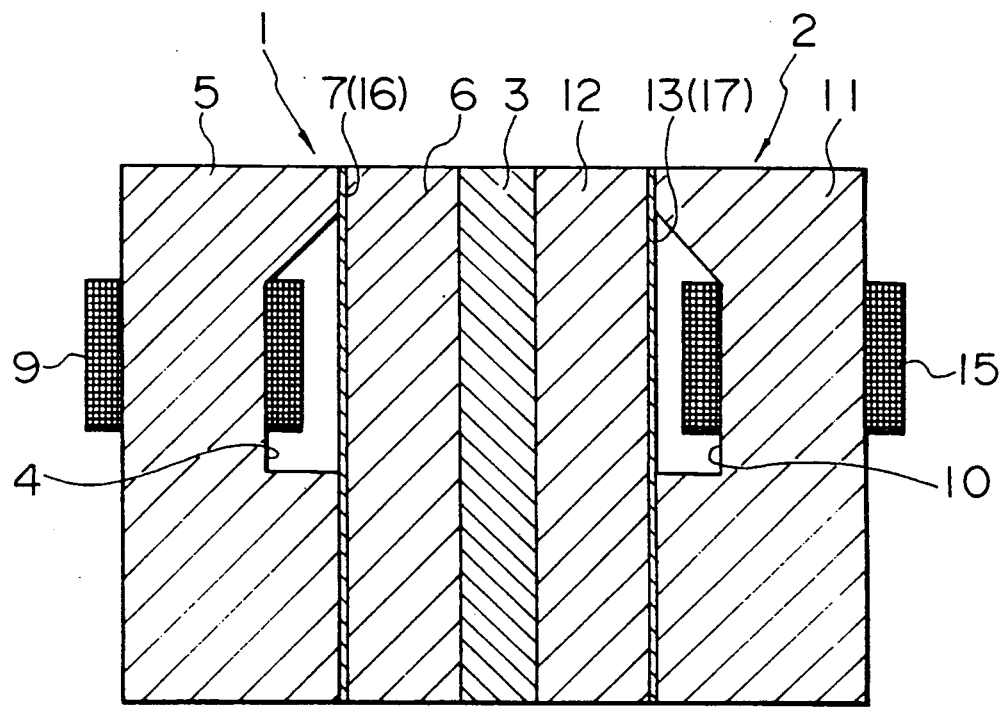
FIG. 5, is a sectional view taken along the line A—A of FIG. 4.
Figure 6:
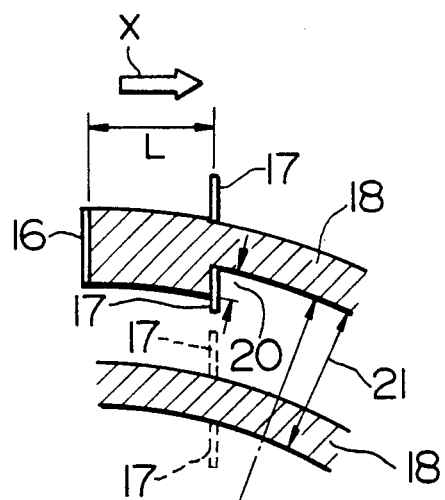
FIG. 6 is an explanatory view showing the manner of formation of recording tracks by means of the composite magnetic head in the portion of a magnetic disc located on the, outer peripheral region.
Figure 7:
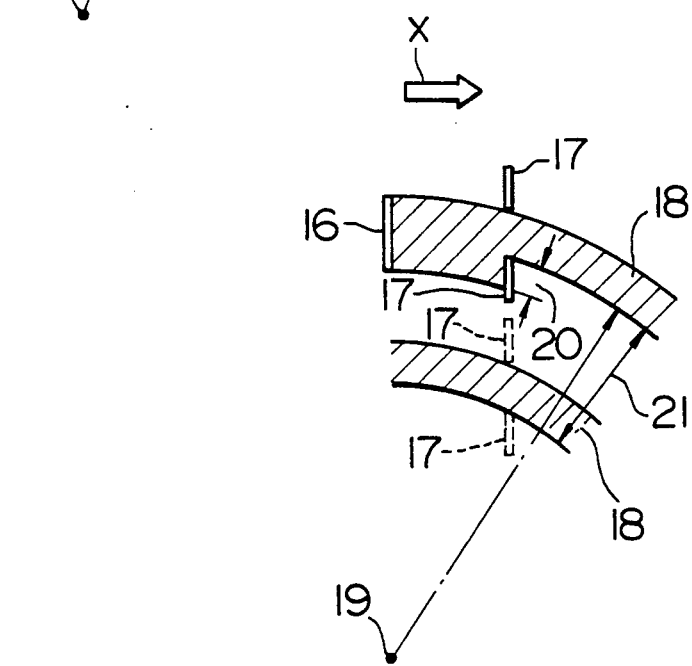
FIG. 7 is an explanatory view showing the manner of formation of the tracks by the magnetic head in the portion of the magnetic disc located on the inner peripheral region.

In an experimental example, the core halves 40 and 41 were made of single crystal Mn-Zn ferrite containing 19% by weight of MnO, 11% by weight of ZnO and 70% by weight of $Fe_2O_3$, while the reinforcing portion 43 was made of glass having a thermal expansion coefficient lower than that of the single crystal Mn-Zn ferrite. As shown in FIG. 2, the width of each track was 30 $\mu$m, the thickness of the chip was 120 $\mu$m, the length of the chip of the erasing head 32 was 100 $\mu$m at its one portion adjacent to the recording and reproducing head and 2 mm at its other portion located on the opposite side, and the joint angle, the depth and the length of the coil groove 39 are 45°, 0.5 mm and 1.0 mm, respectively. Then, the erasing efficiency was investigated by changing variously the angle $\theta$ between the orientation <100> existing in the plane (100) of the single crystal Mn-Zn ferrite forming the core halves 40 and 41 and the face or plane defining the magnetic gap 42. Result of the investigation is shown in FIG. 3. The erasing efficiency is obtained through measurement of the ratio of a level of a signal left unerased to a level of signal recorded by means of a reference head, where the erasing operation was carried out by a DC current equivalent to a magnetomotive force of 1 AT (ampere-turn).

As seen from FIG. 3, when the angle $\theta$ is in the range of 10°-40° or 80°-120°, the erasing efficiency is not larger than $-25$ dB, which means that the erasing efficiency is high. Particularly when the angle $\theta$ is in the range of 15°-35° or 90°-110°, excellent erasing efficiency is attained.

Figure 8:
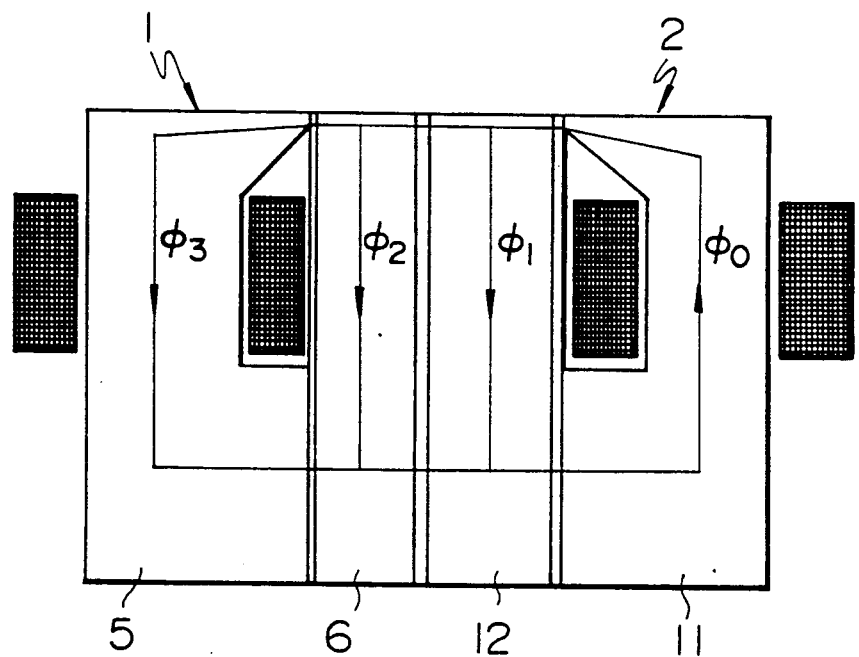
FIG. 8 is a explanatory view showing crosstalk phenomenon.

Such excellent erasing efficiency contributes to great decrease of magnetic fluxes $\Phi_2$ and $\Phi_3$ shown in FIG. 8 even if the distance between the gaps is reduced, thereby preventing occurrence of crosstalk between the erasing head and the recording/playback head, with the result that the recording and reproducing characteristic can be improved.

Figure 9:
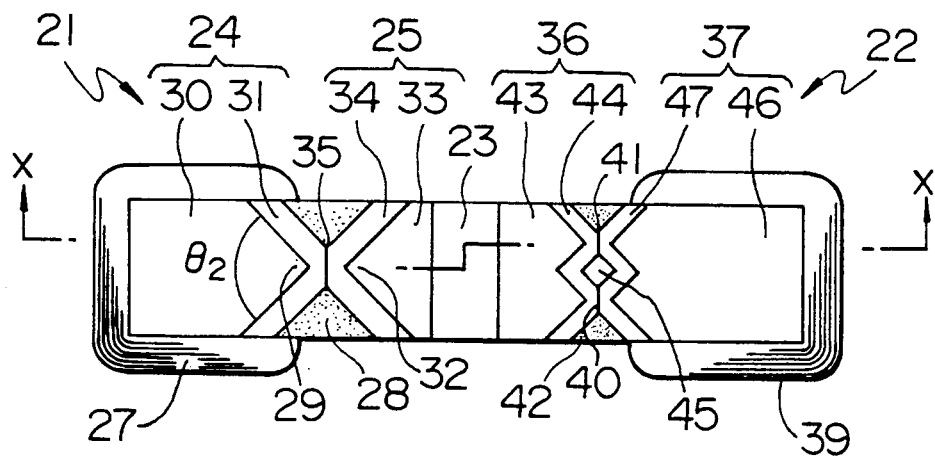
FIG. 9 is a plan view of a composite magnetic head in accordance with another embodiment of the present invention.
Figure 10:
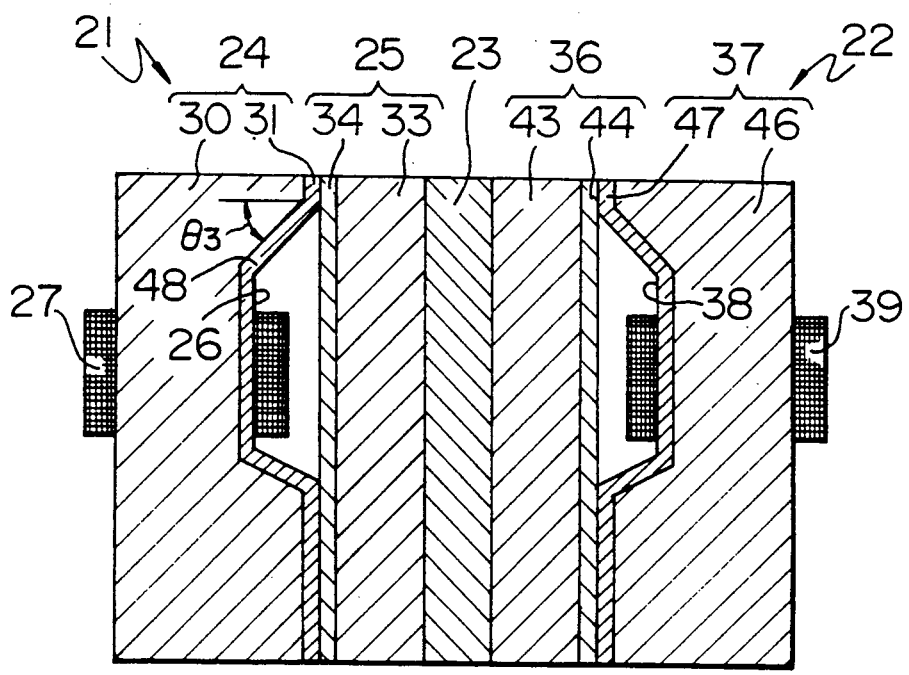
FIG. 10 is a sectional view taken along the line X—X of FIG. 9.

As shown in FIGS. 9 and 10, the composite magnetic head may have an erasing head and a recording/playback head the core halves of which are each made by forming thin films of amorphous alloy containing Co and Zr on the base members of single crystal Mn-Zn ferrite. This composite magnetic head can also achieve the same function and effect as those by the first embodiment. In these drawings, a reference numeral 21 denotes a recording/playback head; 22, an erasing head; 23, a nonmagnetic material; 24, 25, 36, 37, core halves formed by Mn-Zn ferrite base members 30, 33, 43, 46 and amorphous alloy films 31, 34, 44, 47; 27, 39, coils; 35, a gap of the recording/playback head; 41, 40, gaps of the erasing head; 26, 38, coil grooves; and 28, 42, 45, reinforcing portions made of glass or the like.

The invention being thus described, it will be obvious that the same be varied in many ways. Such variations are not to be regarded as a departure from the spirit and scope of the invention, and all such modifications as would be obvious to one skilled in the art are intended to be included within the scope of the following claims.

What is claimed is:

1. A composite magnetic head having a recording/playback head and an erasing head combined in one unit through a nonmagnetic material, comprising:

first and second core halves constituting the erasing head, at least a first core half adjacent the recording/playback head being made of single crystal ferrite, a plane (100) of said single crystal ferrite of said first core half being substantially parallel to a principal magnetic path-forming plane of magnetic flux passing through said first core half, and an angle θ between an orientation <100> existing in said plane (100) of said first core half and a magnetic gap-forming plane between said first and second core halves being in a range of 10°–40° or 80°–120°.

2. A composite magnetic head according to claim 1, wherein the nonmagnetic material serving to isolate the recording/playback head and the erasing head from each other is a material selected from a group consisting of aluminum oxide, zirconia, silicon dioxide and beryllium copper.

3. A composite magnetic head according to claim 1, wherein the thickness of the nonmagnetic material is in a range of 1 μm–0.1 mm.

4. A composite magnetic head according to claim 1, wherein the core half of the erasing head adjacent to the recording/playback head is made of single crystal Mn-Zn ferrite.

5. A composite magnetic head according to claim 1, wherein both core halves of the erasing head are made of single crystal Mn-Zn ferrite.

6. A composite magnetic head according to claim 4, wherein the thickness of the nonmagnetic material is in a range of 1 μm–0.1 mm.

7. A composite magnetic head comprising:
recording/playback head means, for recording data onto and reproducing data from a recording track of a recording medium, formed of first and second core halves with a first gap spacer therebetween;
erasing head means, coupled to said recording/playback head means, for partially erasing the data recorded on said recording track of said recording medium to provide an accurately recorded track; and
a nonmagnetic layer, interposed between said recording/playback head means and said erasing head means, for reducing magnetic interaction therebetween,
said erasing head means comprising a third core half, adjacent said nonmagnetic layer, and a fourth core half with a second gap spacer formed therebetween, said third core half functioning as cross-talk inhibition means for further inhibiting magnetic interaction between said recording/playback head means and said erasing head means, said third core half being formed of single crystal ferrite wherein a plane (100) thereof being substantially parallel to a principal magnetic path-forming plane of magnetic flux passing through said third core half and an angle θ between an orientation <100> existing in said plane (100) of said third core half and a plane of said second gap spacer of said erasing head means being in a range of 10°–40° or 80°–120°.

8. A composite magnetic head according to claim 7, wherein said nonmagnetic layer is a material selected from a group consisting of aluminum oxide, zirconia, silicon dioxide and beryllium copper.

9. A composite magnetic head according to claim 7, wherein a thickness of said nonmagnetic layer is in a range of 1μm–0.1mm.

10. A composite magnetic head according to claim 7, wherein said third core half of said erasing head means is made of single crystal Mn-Zn ferrite.

11. A composite magnetic head according to claim 7, wherein both said third and fourth core halves of said erasing head means are made of single crystal Mn-Zn ferrite.

* * * * *